US009819676B2

United States Patent
Han et al.

(10) Patent No.: US 9,819,676 B2
(45) Date of Patent: Nov. 14, 2017

(54) BIOMETRIC CAPTURE FOR UNAUTHORIZED USER IDENTIFICATION

(71) Applicant: Apple Inc., Cupertino, CA (US)

(72) Inventors: Byron B. Han, Cupertino, CA (US); Craig A. Marciniak, Cupertino, CA (US); John A. Wright, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/143,446

(22) Filed: Apr. 29, 2016

(65) Prior Publication Data

US 2016/0248769 A1    Aug. 25, 2016

Related U.S. Application Data

(63) Continuation-in-part of application No. 13/802,558, filed on Mar. 13, 2013, now abandoned.
(Continued)

(51) Int. Cl.
*H04L 29/06* (2006.01)
*G06F 21/32* (2013.01)
(Continued)

(52) U.S. Cl.
CPC ......... *H04L 63/0861* (2013.01); *G06F 21/32* (2013.01); *G06F 21/88* (2013.01); *H04L 9/3231* (2013.01)

(58) Field of Classification Search
None
See application file for complete search history.

(56) References Cited

U.S. PATENT DOCUMENTS

| 5,872,834 A | 2/1999 | Teitelbaum |
| 6,256,737 B1 | 7/2001 | Bianco et al. |

(Continued)

FOREIGN PATENT DOCUMENTS

| CA | EP 2597585 A1 * | 5/2013 | ............. G06F 21/32 |
| CN | 1268234 | 9/2000 | |

(Continued)

OTHER PUBLICATIONS

Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.

*Primary Examiner* — Hadi Armouche
*Assistant Examiner* — Andrew Steinle
(74) *Attorney, Agent, or Firm* — Brownstein Hyatt Farber Schreck, LLP

(57) ABSTRACT

A computing device may determine to capture biometric information in response to the occurrence of one or more trigger conditions. The trigger condition may be receipt of one or more instructions from one or more other computing devices, detection of potential unauthorized use by the computing device, normal operation of the computing device, and so on. The computing device may obtain biometric information and may store such biometric information. Such biometric information may be one or more fingerprints, one or more images of a current user of the computing device, video of the current user, audio of the environment of the computing device, forensic interface use information, and so on. The computing device may then provide the stored biometric information for identification of one or more unauthorized users.

22 Claims, 11 Drawing Sheets

Related U.S. Application Data

(60) Provisional application No. 61/666,739, filed on Jun. 29, 2012.

(51) Int. Cl.
*H04L 9/32* (2006.01)
*G06F 21/88* (2013.01)

(56) References Cited

U.S. PATENT DOCUMENTS

| | | |
|---|---|---|
| 6,400,836 B2 | 6/2002 | Senior |
| 6,795,569 B1 | 9/2004 | Setlak |
| 6,845,453 B2 | 1/2005 | Scheidt et al. |
| 6,975,202 B1 | 12/2005 | Rodriguez et al. |
| 7,046,139 B2 | 5/2006 | Kuhn et al. |
| 7,065,184 B2 | 6/2006 | Vishik et al. |
| 7,110,987 B2 | 9/2006 | Engelhart |
| 7,210,620 B2 | 5/2007 | Jones |
| 7,246,244 B2 | 7/2007 | Nanavati et al. |
| 7,269,737 B2 | 9/2007 | Robinson |
| 7,278,025 B2 | 10/2007 | Saito et al. |
| 7,502,761 B2 | 3/2009 | Siegal et al. |
| 7,617,399 B2 | 11/2009 | Ebata |
| 7,769,845 B2 | 8/2010 | Baron |
| 7,809,954 B2 | 10/2010 | Miller et al. |
| 7,849,013 B2 | 12/2010 | Engelhart |
| 7,864,987 B2 | 1/2011 | Venkatanna et al. |
| 7,941,664 B2 | 5/2011 | Wheeler |
| 7,953,671 B2 | 5/2011 | Bishop et al. |
| 8,028,896 B2 | 10/2011 | Carter et al. |
| 8,060,413 B2 | 11/2011 | Castell et al. |
| 8,063,889 B2 | 11/2011 | Anderson et al. |
| 8,064,658 B2 | 11/2011 | Iannone |
| 8,072,060 B2 | 12/2011 | Chou |
| 8,145,916 B2 | 3/2012 | Boshra et al. |
| 8,171,531 B2 | 5/2012 | Buer |
| 8,185,646 B2 | 5/2012 | Headley |
| 8,190,908 B2 | 5/2012 | Jazayeri et al. |
| 8,219,495 B2 | 7/2012 | Niwa |
| 8,230,232 B2 | 7/2012 | Ahmed et al. |
| 8,320,638 B2 | 11/2012 | Pitt et al. |
| 8,369,845 B2 | 2/2013 | Zou et al. |
| 8,406,736 B2 | 3/2013 | Das et al. |
| 8,429,760 B2 | 4/2013 | Tribble |
| 8,473,748 B2 | 6/2013 | Sampas |
| 8,566,955 B2 | 10/2013 | Brosnan et al. |
| 8,572,707 B2 | 10/2013 | Tuchman et al. |
| 8,621,561 B2 | 12/2013 | Cross et al. |
| 8,627,417 B2 | 1/2014 | Aoyama |
| 8,627,454 B2 | 1/2014 | Bolyukh |
| 8,660,322 B2 | 2/2014 | Tsai et al. |
| 8,682,798 B2 | 3/2014 | Patterson |
| 8,745,490 B2 | 6/2014 | Kim |
| 8,762,276 B2 | 6/2014 | Lepisto et al. |
| 8,799,670 B2 | 8/2014 | Naccache |
| 8,839,371 B2 | 9/2014 | Ghosh |
| 8,943,326 B2 | 1/2015 | Tamkhane et al. |
| 8,943,580 B2 | 1/2015 | Fadell et al. |
| 8,966,076 B2 | 2/2015 | Kawana et al. |
| 9,098,510 B2 | 8/2015 | Seryakov et al. |
| 9,203,845 B2 | 12/2015 | Webber |
| 9,208,337 B2 | 12/2015 | Tayloe |
| 2002/0018585 A1 | 2/2002 | Kim |
| 2002/0056043 A1 | 5/2002 | Glass |
| 2002/0073416 A1 | 6/2002 | Ramsey Catan |
| 2002/0095586 A1 | 7/2002 | Doyle et al. |
| 2002/0174345 A1 | 11/2002 | Patel |
| 2003/0040339 A1 | 2/2003 | Chang |
| 2003/0046237 A1 | 3/2003 | Uberti |
| 2003/0156740 A1 | 8/2003 | Siegel et al. |
| 2005/0116026 A1 | 6/2005 | Burger et al. |
| 2005/0154920 A1 | 7/2005 | Tartaglia et al. |
| 2005/0229006 A1 | 10/2005 | deMoura et al. |
| 2005/0251688 A1 | 11/2005 | Nanavati et al. |
| 2006/0173793 A1 | 8/2006 | Glass |
| 2006/0204048 A1 | 9/2006 | Morrison et al. |
| 2006/0234764 A1 | 10/2006 | Gamo et al. |
| 2007/0267478 A1 | 11/2007 | Turek et al. |
| 2008/0016371 A1 | 1/2008 | Jiang et al. |
| 2008/0097925 A1 | 4/2008 | King |
| 2008/0103984 A1 | 5/2008 | Choe et al. |
| 2008/0109871 A1 | 5/2008 | Jacobs |
| 2008/0195506 A1 | 8/2008 | Koretz et al. |
| 2009/0240622 A1 | 9/2009 | Zandonadi |
| 2009/0320106 A1* | 12/2009 | Jones ............... G06Q 20/1085 726/5 |
| 2010/0005509 A1 | 1/2010 | Peckover |
| 2010/0167753 A1* | 7/2010 | Das ................. H04L 63/0861 455/456.1 |
| 2010/0195875 A1* | 8/2010 | Iannone ............ G07C 9/00158 382/124 |
| 2010/0218012 A1 | 8/2010 | Joseph et al. |
| 2010/0241571 A1 | 9/2010 | McDonald |
| 2010/0321156 A1 | 12/2010 | Pitt et al. |
| 2010/0321197 A1 | 12/2010 | Wong et al. |
| 2011/0082791 A1 | 4/2011 | Baghdasaryan |
| 2011/0119479 A1 | 5/2011 | Cowie et al. |
| 2011/0138450 A1 | 6/2011 | Kesanupalli et al. |
| 2011/0166922 A1 | 7/2011 | Fuerstenberg |
| 2011/0238476 A1 | 9/2011 | Carr et al. |
| 2011/0246491 A1 | 10/2011 | O'Hare et al. |
| 2011/0291798 A1 | 12/2011 | Schibuk |
| 2011/0300829 A1 | 12/2011 | Nurmi et al. |
| 2012/0123841 A1 | 5/2012 | Taveau et al. |
| 2012/0237908 A1 | 9/2012 | Fitzgerald et al. |
| 2012/0262399 A1 | 10/2012 | Colley et al. |
| 2012/0290376 A1 | 11/2012 | Dryer et al. |
| 2012/0330769 A1 | 12/2012 | Arceo |
| 2013/0067545 A1* | 3/2013 | Hanes .................. H04L 9/3231 726/6 |
| 2013/0124416 A1 | 5/2013 | Pawar et al. |
| 2013/0159699 A1 | 6/2013 | Torkkel |
| 2013/0188927 A1 | 7/2013 | Seryakov et al. |
| 2013/0254906 A1 | 9/2013 | Kessler et al. |
| 2013/0298224 A1 | 11/2013 | Heilpern |
| 2014/0006795 A1 | 1/2014 | Han et al. |
| 2014/0007185 A1 | 1/2014 | Han et al. |
| 2014/0007223 A1 | 1/2014 | Han et al. |
| 2014/0189807 A1 | 7/2014 | Cahill et al. |
| 2014/0279516 A1 | 9/2014 | Rellas et al. |
| 2015/0073998 A1 | 3/2015 | Alsina et al. |
| 2015/0074796 A1 | 3/2015 | Meir et al. |
| 2015/0116086 A1 | 4/2015 | Kim et al. |
| 2015/0199687 A1 | 7/2015 | Han et al. |
| 2015/0220931 A1 | 8/2015 | Alsina et al. |
| 2015/0294382 A1 | 10/2015 | Alsina et al. |
| 2015/0304323 A1 | 10/2015 | Alsina et al. |
| 2016/0182508 A1 | 6/2016 | Gresham et al. |
| 2017/0206528 A1 | 7/2017 | Han et al. |

FOREIGN PATENT DOCUMENTS

| | | |
|---|---|---|
| CN | 1695163 | 11/2005 |
| CN | 1783052 | 6/2006 |
| CN | 1983336 | 6/2007 |
| CN | 101933051 | 12/2010 |
| CN | 102088353 | 6/2011 |
| CN | 103037065 | 4/2013 |
| CN | 103221958 | 7/2013 |
| CN | 103268550 | 8/2013 |
| CN | 103295129 | 9/2013 |
| DE | 202005003042 | 11/2006 |
| DE | 102009027682 | 1/2011 |
| DE | 102012202731 | 8/2013 |
| EP | 1857954 | 11/2007 |
| EP | 2226741 | 9/2010 |
| EP | 2114051 | 6/2012 |
| EP | 2533172 A1 | 12/2012 |
| EP | 2597585 | 5/2013 |
| GB | 2447752 | 9/2008 |
| JP | A 2010140174 | 6/2010 |
| JP | A 2011192288 | 9/2011 |
| KR | 1020120122181 | 11/2012 |

(56) References Cited

FOREIGN PATENT DOCUMENTS

| | | |
|---|---|---|
| TW | I236634 | 7/2005 |
| TW | 200901724 | 1/2009 |
| TW | 200919255 | 5/2009 |
| TW | 201319817 | 5/2013 |
| WO | WO 03/062969 | 7/2003 |
| WO | WO 2008/004312 | 1/2008 |
| WO | WO 2008/030184 | 3/2008 |
| WO | WO 2013/095434 | 6/2013 |

* cited by examiner

BIOMETRIC CAPTURE FOR UNAUTHORIZED USER IDENTIFICATION

CROSS-REFERENCE TO RELATED APPLICATIONS

This application is a continuation-in-part patent application of U.S. patent application Ser. No. 13/802,558, filed Mar. 13, 2013 and titled "Biometric Capture for Unauthorized User Identification," which claims the benefit under 35 U.S.C. §119(e) to U.S. Provisional Patent Application No. 61/666,739, filed Jun. 29, 2012 and titled "Biometric Capture for Unauthorized User Identification," the disclosures of which are hereby incorporated herein by reference in their entireties.

FIELD

This disclosure relates generally to identification of unauthorized users of computing devices, and more specifically to capturing biometric information for identifying unauthorized users.

BACKGROUND

Computing devices (such as smart phones, laptop computers, desktop computers, server computers, mobile computers, tablet computers, digital music players, digital video players, and other such computing devices) may perform a variety of different functions for one or more authorized users. However, various users may attempt to utilize computing devices without authorization. For example, a user's smart phone may be stolen and the thief may attempt to utilize the stolen smart phone. By way of another example, a user's child may obtain access to the user's tablet computer and attempt to utilize the tablet computer without permission from the user.

In various cases, such computing devices may be protected from unauthorized use by one or more authentication systems. For example, a user may be required to provide one or more passwords, pin (personal identification number) codes, and/or biometric information (such as one or more fingerprints) in order to utilize the computing device. Such authentication systems may prevent the computing device from being used should unauthorized users obtain access to the computing device.

However, preventing access by unauthorized users to a computing device may not be sufficient in all cases. For example, some authentication systems may be overcome with sufficient effort and may not be able to prevent access by unauthorized users forever. Users of computing devices may desire to be able to identify one or more unauthorized users who have attempted to utilize the user's computing device. Such identification of unauthorized users who have attempted to utilize a computing device may assist a user in prosecuting unauthorized users, preventing further access in situations where the computing device has not been stolen, recovering the computing device in situations where the computing device has been stolen, and so on.

SUMMARY

The present disclosure discloses systems and methods for capturing biometric information for identifying unauthorized users. A computing device may determine to capture biometric information in response to the occurrence of one or more trigger conditions. The trigger condition may be receipt of one or more instructions from one or more other computing devices, detection of potential unauthorized use by the computing device, normal operation of the computing device, and so on. The computing device may obtain biometric information and may store such biometric information. Such biometric information may be one or more fingerprints, one or more images of a current user of the computing device, video of the current user, audio of the environment of the computing device, forensic interface use information, and so on. The computing device may then provide the stored biometric information for identification of one or more unauthorized users.

In various implementations, the computing device may transmit the stored biometric information to one or more server computers and/or to one or more user communication addresses (such as one or more electronic mail addresses, phone numbers, and such) associated with an authorized user of the computing device. Such transmission may be automatic, performed upon receipt of one or more transmit requests, and so on. In other cases, the computing device may store the biometric information without transmitting such.

In one or more implementations, the computing device (and/or another computing device to which the computing device has transmitted the biometric information) may not endlessly store the biometric information. In some cases, biometric information may be purged over time according to one or more purging rules. In such cases, biometric information captured in association with a certain number of unauthorized access attempts (such as fifty), biometric information captured over a certain period of time (such as three days), biometric information associated with all unauthorized access attempts over a certain period of time (such as one month), and so on may be stored. Previously captured biometric information may be purged in such cases.

In some implementations, the computing device (and/or another computing device to which the computing device has transmitted the biometric information) may evaluate the biometric information to attempt to identify the unauthorized user associated with the biometric information and/or ascertain activities that the unauthorized user attempted to perform.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. Embodiments described herein may be configured to operate with a variety of sensors, including strip or swipe sensors, array or other two-dimensional sensors, and the like. However, it should be understood that the described disclosure may be practiced in a variety of forms in addition to those described herein.

The present disclosure discloses systems and methods for capturing biometric information for identifying unauthorized users. A computing device may determine to capture biometric information in response to the occurrence of one or more trigger conditions. The computing device may obtain biometric information and may store such biometric information. The biometric information may be stored in an encrypted and/or otherwise hidden form. The computing device may then provide the stored biometric information for identification of one or more unauthorized users. In this way, unauthorized users of computing devices may be reliably tracked and/or identified.

Figure 1:
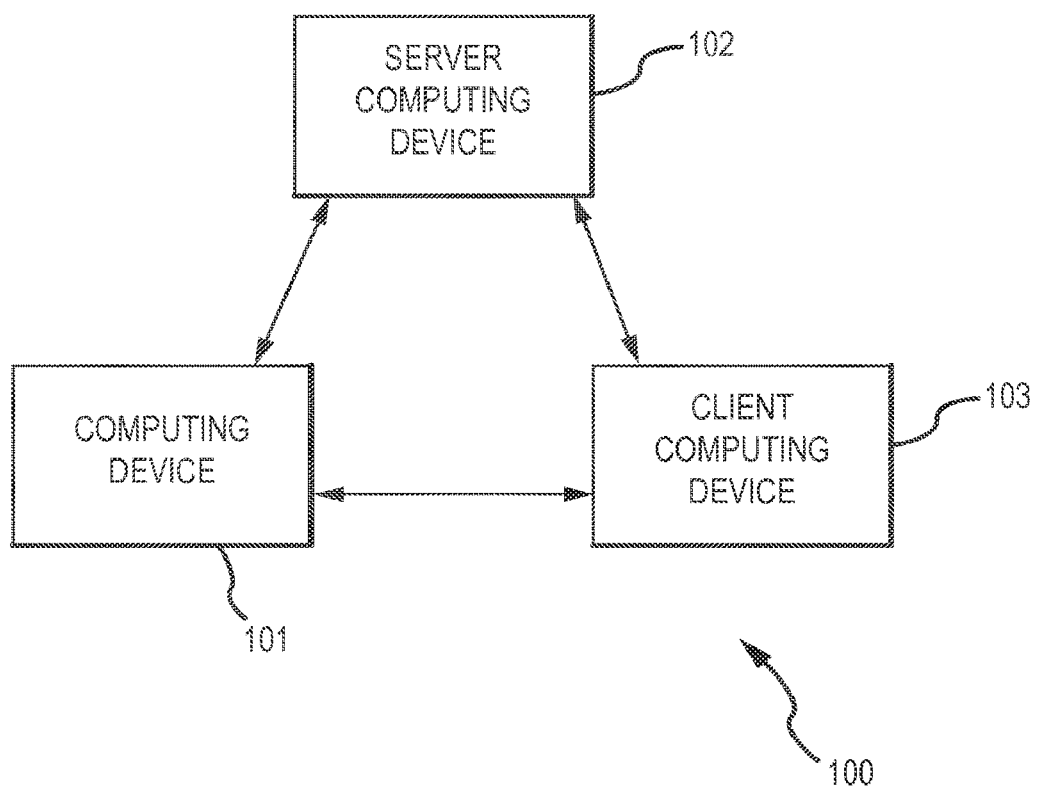
FIG. 1 is a block diagram illustrating a system that captures biometric information for identifying unauthorized users.

FIG. 1 is a block diagram illustrating a system 100 for capturing biometric information for identifying unauthorized users. The system includes a computing device 101, which may be any kind of computing device such as a smart phone, a laptop computer, a desktop computer, a mobile computer, a tablet computer, a digital music player, a digital video player, and/or other such computing device. The computing device may determine to capture biometric information in response to the occurrence of one or more trigger conditions, obtain biometric information, and store such biometric information. The computing device may provide the stored biometric information for identification of one or more unauthorized users. The system may also include one or more server computing devices 102 (such as one or more server computing devices configured in a cloud computing arrangement) and/or one or more client computing devices 103 that may be configured to communicate with each other and/or with the computing device.

In some implementations, the trigger condition may be receipt of one or more instructions from one or more other computing devices (such as the server computing device 102 and/or or the client computing device 103) to capture biometric information. For example, one or more server computers that communicate with the computing device 101 may transmit such an instruction to the computing device in response to a request received from the user of the computing device (though in some cases the instruction may be transmitted to the computing device from another computing device utilized by the user such as the client computing device without the involvement of a server computing device), in response to detection of potential unauthorized use of the computing device by the server computing device, and so on. In other implementations, the trigger condition may be detection of potential unauthorized use by the computing device. For example, if the computing device receives more than a threshold number of failed authentication attempts (such as five), the computing device may begin capturing biometric information as the computing device receives such from one or more biometric sensors. In still other implementations, the trigger condition may be operation of the computing device. In such implementations the trigger condition is met whenever the computing device operates and the computing device will always capture received biometric information during operation (though in some cases the amount and/or type of biometric information that is captured, the frequency at which the biometric information is captured, what the computing device does with captured biometric information, and such may be escalated upon the occurrence of one or more other trigger conditions such as receipt of an instruction to escalate biometric capture and/or detection of potential unauthorized use).

By way of example, in one or more implementations, if the computing device 101 receives a failed authentication, the computing device may immediately capture a fingerprint of the current user of the computing device (i.e., the user that provided the failed authentication) and capture a picture of the current user of the computing device. The computing device may store the fingerprint and picture and may transmit the fingerprint and picture to a central server that tracks potential unauthorized usage of the computing device.

In various implementations, the computing device 101 may capture one or more of a variety of different types of biometric information that the computing device receives from one or more biometric related sensors associated with the computing device. For example, the computing device may obtain one or more fingerprints from one or more fingerprint sensors, user images (and/or video of a user) utilizing one or more image capture devices (such as one or more cameras), audio from the environment in which the computing device is being used utilizing one or more audio capture devices (such as one or more microphones), forensic interface use information (such as the speed, pressure, and such at which elements of a user interface are utilized, which may be unique or highly personalized to particular users), and so on.

Further, other information in addition to the biometric information may also be captured and/or associated with the biometric information. In some cases, the computing device

101 may time stamp the received biometric information so that it may be determined at exactly what time a particular user was utilizing the computing device. In various cases, the computing device may include one or more location sensors, such as one or more global positioning system sensors, and the computing device may associate navigation information with the biometric information so that the location of the computing device at the time a particular user attempted to utilize the computing device (or just the location of the computing device) may be determined.

In one or more implementations, the computing device 101 may provide the stored biometric information in a variety of different ways. In some cases, the computing device may transmit the stored biometric information to one or more server computers (such as the server computing device 102) (which may store the transmitted biometric information) and/or to one or more user communication addresses (such as one or more electronic mail addresses, phone numbers, and such) associated with an authorized user of the computing device (which the authorized user may access via the client computing device 103). Such transmission may be automatic, performed upon receipt of one or more transmit requests, and so on. In other cases, the computing device may store the biometric information without transmitting such. In situations where the computing device has been stolen and is then recovered, the stored information may be obtained from the storage of the computing device in order to identify who had stolen the recovered computing device.

In various implementations, the computing device 101 may be configured to evaluate various factors such as the trigger conditions that trigger capture of biometric information, the frequency at which the biometric information is captured, what the computing device does with captured biometric information, and so on based at least on one or more defaults, security policies, enterprise network policies, user preferences, and/or other such settings. In some cases, the computing device may adjust the basis for evaluation of such factors according to one or more machine learning processes. For example, the computing device may be configured to capture fingerprints whenever an application is accessed for the first time. If the application is successfully accessed without authentication failure for a particular number of times (such as three), the computing device may cease capturing fingerprints. In such a case, the computing device may resume capturing fingerprints when the application is accessed if a certain number of authentication failures associated with the application are received (such as four).

In one or more implementations, the computing device 101 (and/or another computing device to which the computing device has transmitted the biometric information such as the server computing device 102 and/or the client computing device 103) may not endlessly store the biometric information. In some cases, biometric information may be purged over time according to one or more purging rules. In such cases, biometric information captured in association with a certain number of unauthorized access attempts (such as fifty), biometric information captured over a certain period of time (such as three days), biometric information associated with all unauthorized access attempts over a certain period of time (such as one month), and so on may be stored. Previously captured biometric information may be purged in such cases.

In such implementations, purging of previously stored biometric information may be performed in order to reduce storage requirements. However, such purging may also be performed under the assumption that if the stored biometric information is not needed by a certain point in time then it may not be needed at all and no longer needs to be stored. In still other cases, the biometric information may not be a complete set of biometric information. In such cases, the biometric information that is stored may correspond to a complete set of biometric information and the previous biometric information that is purged may correspond to a different complete set of biometric information.

For example, the computing device 101 may only capture and store a portion of a fingerprint at a time. Over a particular number of captures (such as fifteen captures), the computing device may capture a complete fingerprint. As such, the computing device (and/or another computing device such as the server computing device 102 and/or the client computing device 103) may continue to store the fifteen captures associated with a particular fingerprint in order to store the complete fingerprint and may purge previous captures that correspond to a different fingerprint.

In some implementations, the computing device 101 (and/or another computing device to which the computing device has transmitted the biometric information such as the server computing device 102 and/or the client computing device 103) may evaluate the biometric information to attempt to identify the unauthorized user associated with the biometric information and/or ascertain activities that the unauthorized user attempted to perform. For example, a captured fingerprint may be compared to a database containing fingerprints of known users (such as fingerprints of all users of a cellular service network that have been captured by the cellular service network). By way of another example, a number of captured keystrokes entered by an unauthorized user may be grouped and analyzed to determine one or more operations that the unauthorized user was attempting to perform utilizing the computing device (such as access a digital music purchasing account accessible from the computing device).

By way of a first example implementation, the computing device 101 may be a smart phone. The smart phone may include one or more buttons and/or other input sensors (such as one or more "home" buttons) and may include a fingerprint sensor located under one or more of the buttons. In some cases, the smart phone may be configured to capture a fingerprint utilizing the fingerprint sensor whenever the button is pressed by a current user (and/or upon the occurrence of a triggering condition). The smart phone may perform such fingerprint capture with the current user's knowledge (such as by displaying one or more prompts and/or notification) or may perform such fingerprint capture in the background without in any way making the user aware that such fingerprint capture is being performed. Upon the occurrence of a triggering condition, such as receipt of an instruction from a server computer associated with a cellular or data service account corresponding to the smart phone (which may be transmitted in response to an authorized user of the smart phone notifying the server that the smart phone has been stolen), the smart phone may capture and store such a fingerprint and may transmit the captured fingerprint to a cloud data storage service performed by the server associated with the cellular or data service account corresponding to the smart phone. In addition to the fingerprint, the smart phone may also capture and transmit other biometric information (such as utilizing one or more cameras to capture and transmit an image of the current user) to the cloud data storage service. The authorized user of the smart phone may then obtain the fingerprint (and/or other biometric information) from the cloud data storage service utilizing a client computing device (which may or may not be the smart phone).

By way of a second example implementation, the computing device 101 may be a tablet computer. The tablet computer may include one or more touch screens and may include a fingerprint sensor located under the touch screen. In some cases, the tablet computer may be configured to utilize a fingerprint of the current user captured via the fingerprint sensor as a means for authorizing the current user (such as by comparing the current user's fingerprint to a stored encrypted version of an authorized fingerprint). Upon the occurrence of a triggering condition, such a failed authorization attempt (i.e., the current user's fingerprint does not match the stored authorized fingerprint), the tablet computer may capture and store the current user's fingerprint and may transmit the captured fingerprint to a cloud data storage service performed by a server associated with a data service account corresponding to the tablet computer. The authorized user of the tablet computer may then obtain the fingerprint (and/or other biometric information) from the cloud data storage service utilizing a client computing device (which may or may not be the tablet computer).

Various example methods for capturing biometric information for identifying unauthorized users will now be described in detail. Such methods may be performed by the system 100 of FIG. 1.

Figure 2:
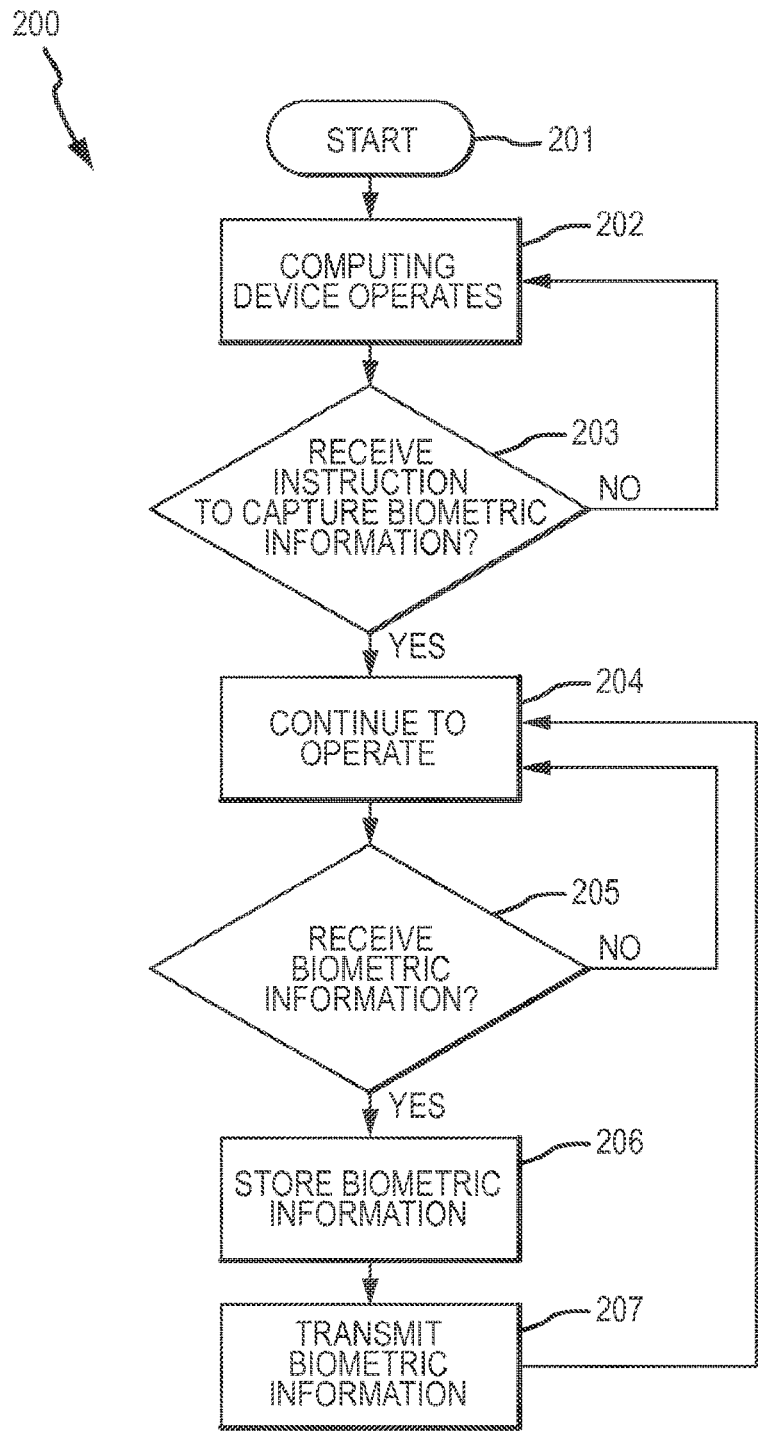
FIG. 2 is a flow chart illustrating a first example method for capturing biometric information for identifying unauthorized users. The method may be performed by the system of FIG. 1.

FIG. 2 illustrates a first example method 200 for capturing biometric information for identifying unauthorized users. The method may be performed by the computing device 101 of FIG. 1. The flow begins at block 201 and proceeds to block 202 where the computing device operates. The flow then proceeds to block 203 where the computing device determines whether or not an instruction has been received (such as from a computing device such as the server computing device 102 and/or the client computing device 103) to capture biometric information. If so, the flow proceeds to block 204. Otherwise, the flow returns to block 202 and the computing device continues to operate At block 204, after the computing device has received the instruction to capture biometric information, the computing device continues to operate and the flow proceeds to block 205. At block 205, the computing device determines whether or not biometric information has been received from one or more users (such as via one or more biometric sensors). If so, the flow proceeds to block 206. Otherwise, the flow returns to block 204 and the computing device continues to operate.

At block 206, after the computing device has received biometric information, the computing device stores the received biometric information. The flow then proceeds to block 207.

At block 207, the computing device transmits the stored biometric information, such as to a computing device such as the server computing device 102 and/or the client computing device 103. The flow then returns to block 204 where the computing device continues to operate.

Although the method 200 is illustrated and described above as including particular operations performed in a particular order, it is understood that this is for the purposes of example. Other arrangements that may include fewer and/or more operations are contemplated and possible without departing from the scope of the present disclosure. For example, the method 200 is illustrated and described above as transmitting biometric information whenever captured. However, in some cases the computing device may store biometric information whenever received after receipt of an instruction to capture but may only periodically transmit such information, such as upon the expiration of a time period (such as an hour), whenever a certain amount of biometric information is stored (such as five hundred kilobytes), and so on. In such cases, such periodic transmission may include all biometric information stored since the previous transmission.

Figure 3:
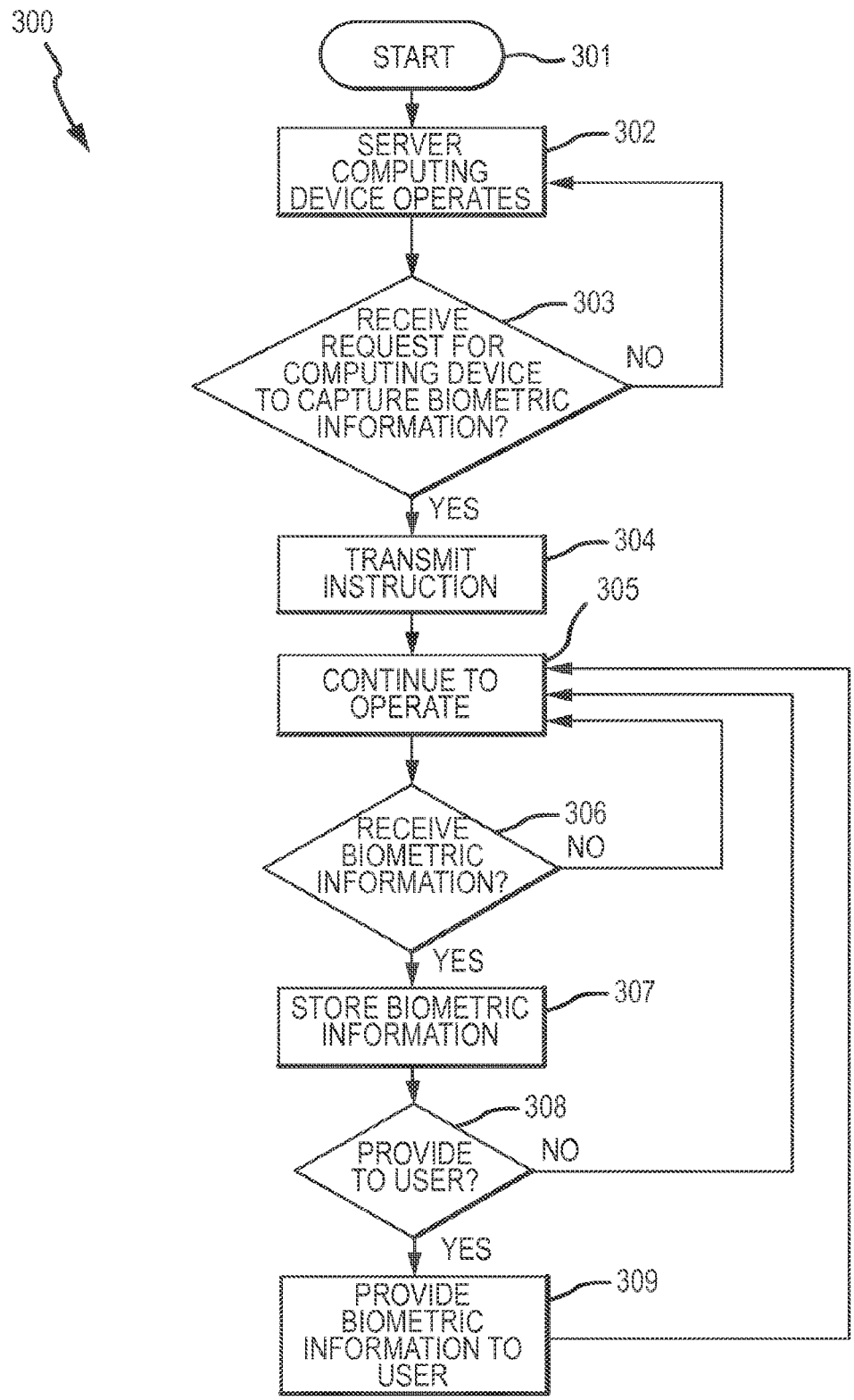
FIG. 3 is a flow chart illustrating a second example method for capturing biometric information for identifying unauthorized users. The method may be performed by the system of FIG. 1.

FIG. 3 illustrates a second example method 300 for capturing biometric information for identifying unauthorized users. The method 300 may be performed by the server computing device 102 of FIG. 1. The flow begins at block 301 and proceeds to block 302 where the server computing device operates. The flow then proceeds to block 303 where the server computing device determines whether or not a request is received from a user (such as from the client computing device 103) for a computing device (such as the computing device 101) to capture biometric information. If so, the flow proceeds to block 304. Otherwise, the flow returned to block 302 and the server computing device continues to operate.

At block 304, the server computing device transmits an instruction to the appropriate computing device instructing the computing device to capture biometric information. The flow then proceeds to block 305 where the server computing device continues to operate before the flow proceeds to block 306.

At block 306, the server computing device determines whether or not captured biometric information is received from the instructed computing device. If so, the flow proceeds to block 307. Otherwise, the flow returns to block 305 where the computing device continues to operate.

At block 307, after the server computing device determines that captured biometric information is received from the instructed computing device, the server computing device stores the received biometric information. The flow then proceeds to block 308 where the server computing device determines whether or not to provide such stored biometric information to the requesting user. Such a determination may be based on whether the user has requested stored biometric information, whether a threshold amount of biometric information has been stored (such as a complete fingerprint), and/or other such factors.

If the server computing device determines to provide such stored biometric information to the requesting user, the flow proceeds to block 309 where the server computing device provides the stored biometric information to the requesting user (such as by transmitting the stored biometric information to the client computing device 103) before the flow returns to block 305 and the server computing device continues to operate. Otherwise, the flow returns directly to block 305.

Although the method 300 is illustrated and described above as including particular operations performed in a particular order, it is understood that this is for the purposes of example. Other arrangements that may include fewer and/or more operations are contemplated and possible without departing from the scope of the present disclosure. For example, the method 300 is illustrated and described above as just providing stored biometric information. However, in some cases the server computing device may also evaluate the biometric information (such as comparing a stored fingerprint to a database of user fingerprints to ascertain the identity of the user to whom the fingerprint belongs) and provide information regarding such analysis along with or instead of the stored biometric information.

Figure 4:
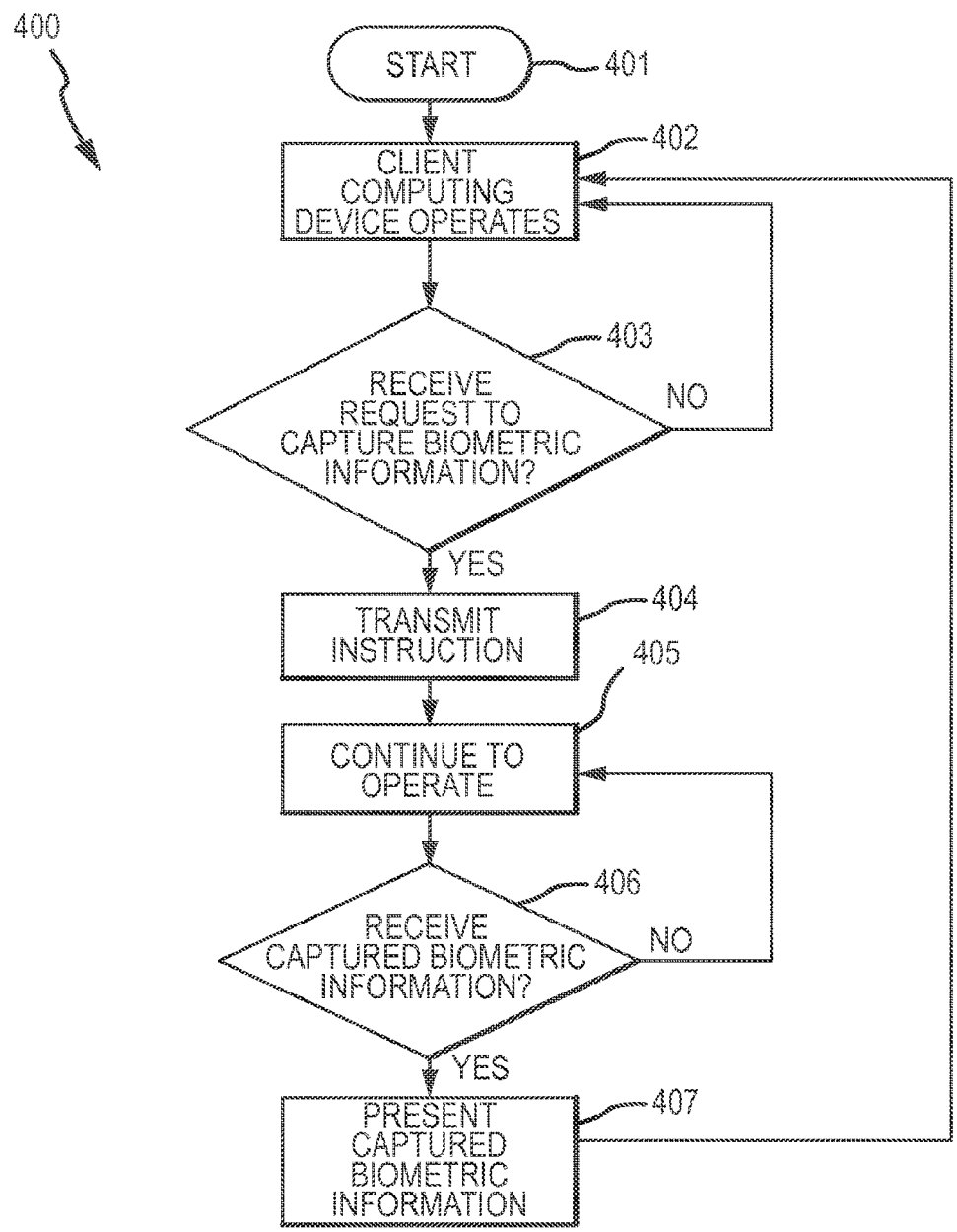
FIG. 4 is a flow chart illustrating a third example method for capturing biometric information for identifying unauthorized users. The method may be performed by the system of FIG. 1.

FIG. 4 illustrates a third example method 400 for capturing biometric information for identifying unauthorized users. The method 400 may be performed by the client computing device 103 of FIG. 1. The flow begins at block 401 and proceeds to block 402 where the client computing device operates. The flow then proceeds to block 403 where the client computing device determines whether or not a request is received from a user for a computing device (such as the computing device 101) to capture biometric information. If so, the flow proceeds to block 404. Otherwise, the flow returns to block 402 where the client computing device continues to operate.

For example, the client computing device may execute instructions stored in a non-transitory machine-readable medium to implement a "find my computing device" web application. The user may utilize such a web application to request that the user's computing device capture biometric information.

At block 404, after the client computing device determines a request is received from a user for a computing device to capture biometric information, the client computing device transmits an instruction to the computing device (which may be sent via the server computing device 102) instructing the computing device to capture biometric information. The flow then proceeds to block 405 where the client computing device continues to operate. Next, the flow proceeds to block 406.

At block 406, the client computing device determines whether or not captured biometric information is received (such as from the computing device 101 and/or via the server computing device 102). If so, the flow proceeds to block 407 where the client computing device presents the captured biometric information to the user before the flow returns to block 402 and the client computing device continues to operate. Otherwise, the flow returns to block 405 and the client computing device continues to operate.

Although the method 400 is illustrated and described above as including particular operations performed in a particular order, it is understood that this is for the purposes of example. Other arrangements that may include fewer and/or more operations are contemplated and possible without departing from the scope of the present disclosure. For example, the method 400 is illustrated and described above as proceeding to block 402 after presenting received biometric information to the user. However, in various implementations multiple sets of biometric information may be received and presented to the user. In such implementations the flow may return from block 407 to block 405 where the client computing device continues to operate.

Figure 5:
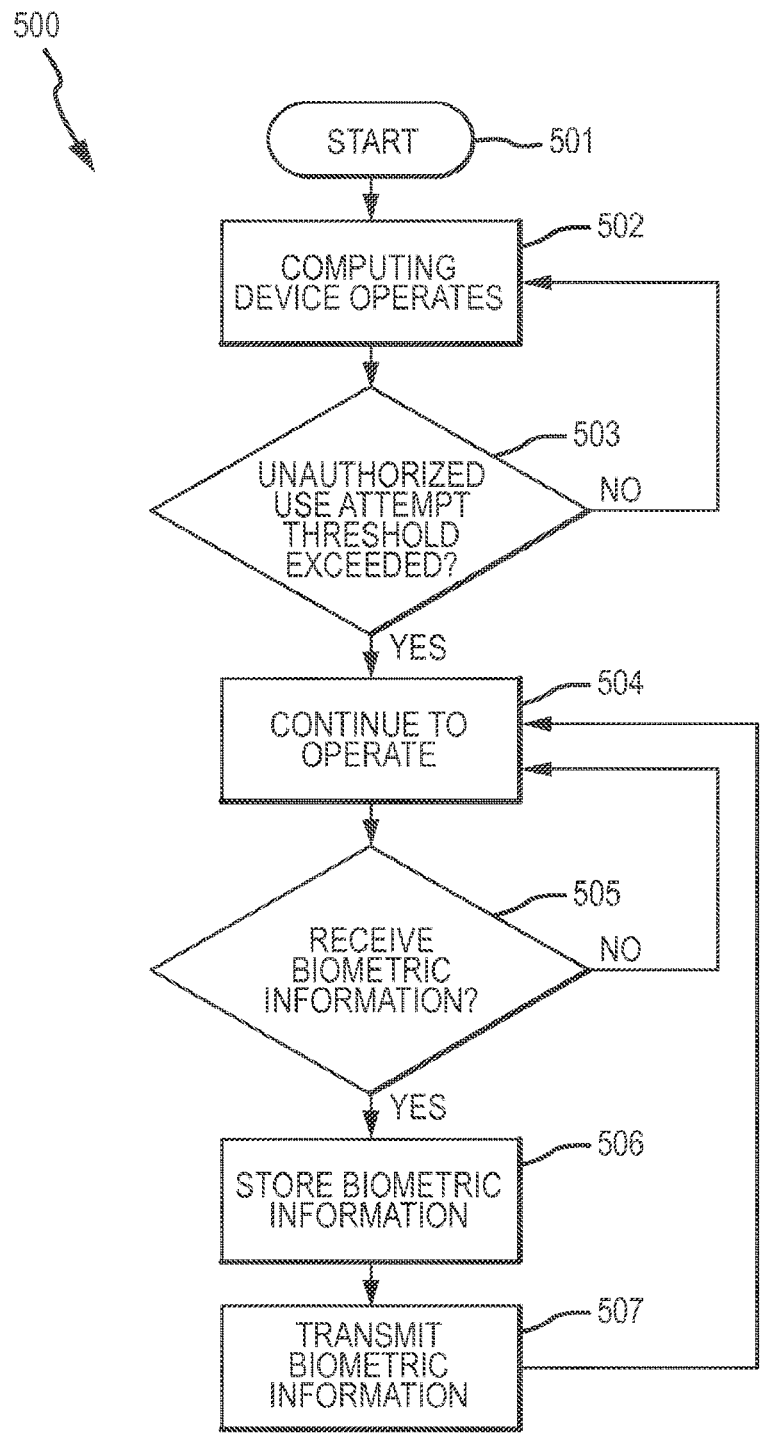
FIG. 5 is a flow chart illustrating a fourth example method for capturing biometric information for identifying unauthorized users. The method may be performed by the system of FIG. 1.

FIG. 5 illustrates a fourth example method 500 for capturing biometric information for identifying unauthorized users. The method 500 may be performed by the computing device 101 of FIG. 1. The flow begins at block 501 and proceeds to block 502 where the computing device operates. The flow then proceeds to block 503 where the computing device determines whether or not more than a threshold number of unauthorized use attempts have occurred (such as ten). If so, the flow proceeds to block 504. Otherwise, the flow returns to block 502 where the computing device continues to operate.

At block 504, after the computing device determines more than a threshold number of unauthorized use attempts have occurred the computing device continues to operate and the flow proceeds to block 505. At block 505, the computing device determines whether or not biometric information has been received. If so, the flow proceeds to block 506. Otherwise, the flow returns to block 504 and the flow continues to operate.

At block 506, after the computing device determines that biometric information has been received, the computing device stores the biometric information and the flow proceeds to block 507. At block 507, the computing device transmits the captured biometric information (such as to the server computing device 102 and/or the client computing device 103). The flow then returns to block 504 and the computing device continues to operate.

Although the method 500 is illustrated and described above as including particular operations performed in a particular order, it is understood that this is for the purposes of example. Other arrangements that may include fewer and/or more operations are contemplated and possible without departing from the scope of the present disclosure. For example, the method 500 is illustrated and described above as returning to block 504 after transmitting captured biometric information. However, in some cases the flow may return to block 502 after transmitting captured biometric information and the computing device may not continue to store biometric information unless the unauthorized use attempt is exceeded again.

Figure 6:
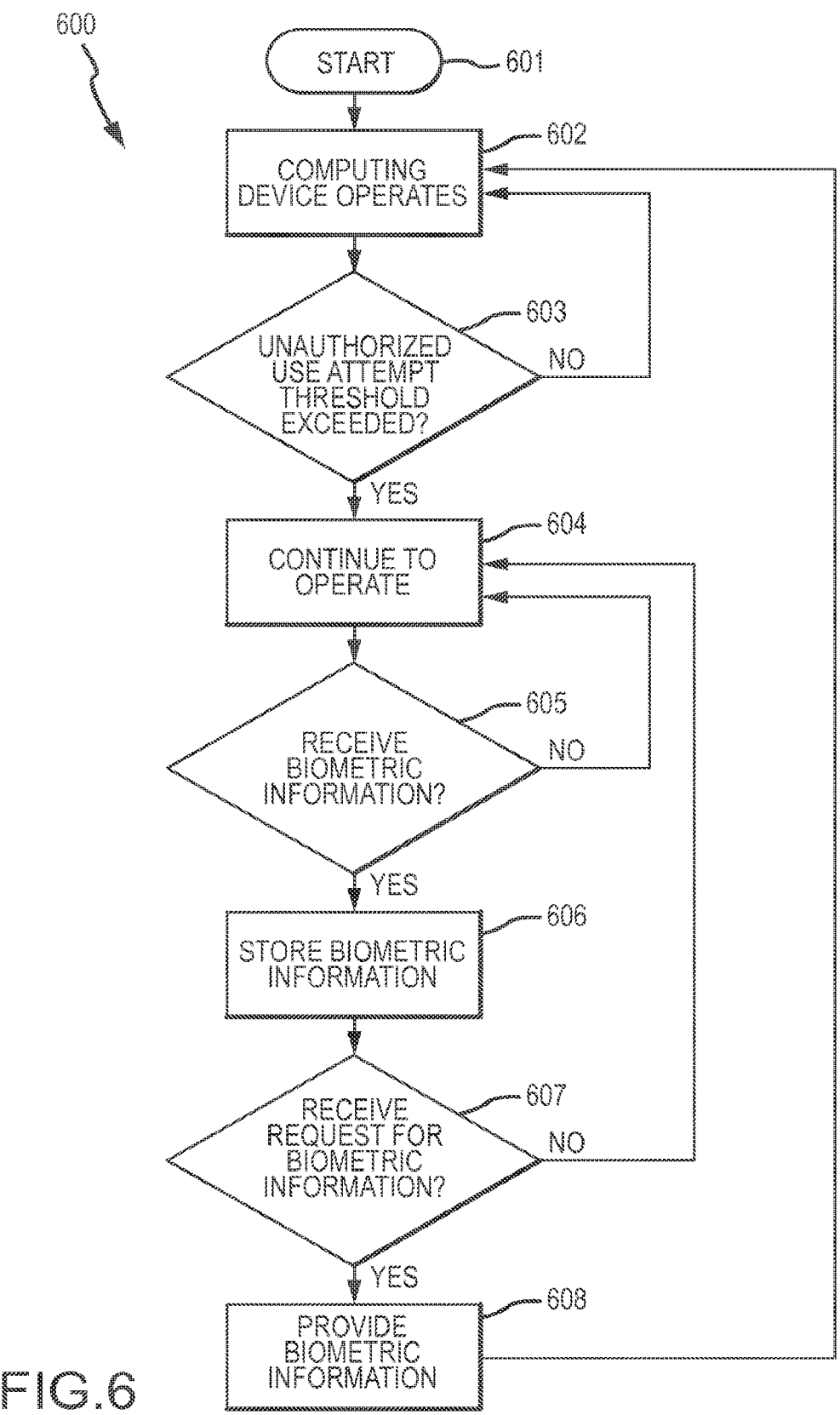
FIG. 6 is a flow chart illustrating a fifth example method for capturing biometric information for identifying unauthorized users. The method may be performed by the system of FIG. 1.

FIG. 6 illustrates a fifth example method 600 for capturing biometric information for identifying unauthorized users. The method 600 may be performed by the computing device 101 of FIG. 1. The flow begins at block 601 and proceeds to block 602 where the computing device operates. The flow then proceeds to block 603 where the computing device determines whether or not more than a threshold number of unauthorized use attempts have occurred (such as ten). If so, the flow proceeds to block 604. Otherwise, the flow returns to block 602 where the computing device continues to operate.

At block 604, after the computing device determines more than a threshold number of unauthorized use attempts have occurred the computing device continues to operate and the flow proceeds to block 605. At block 605, the computing device determines whether or not biometric information has been received. If so, the flow proceeds to block 606. Otherwise, the flow returns to block 604 and the flow continues to operate.

At block 606, after the computing device determines that biometric information has been received, the computing device stores the biometric information and the flow proceeds to block 607. At block 607, the computing device determines whether an authorized user of the computing device has requested the stored biometric information via the computing device. If so, the flow proceeds to block 608 where the computing device provides the stored biometric information before the flow returns to block 602 and the computing device continues to operate. Otherwise, the flow returns directly to block 602 and the flow continues to operate.

Although the method 600 is illustrated and described above as including particular operations performed in a particular order, it is understood that this is for the purposes of example. Other arrangements that may include fewer and/or more operations are contemplated and possible without departing from the scope of the present disclosure. For example, the method 600 is illustrated and described above as returning to block 602 after providing captured biometric information. However, in some cases the flow may return to block 604 after providing captured biometric information and the computing device may continue to store biometric information without requiring that the unauthorized use attempt is exceeded again.

Figure 7:
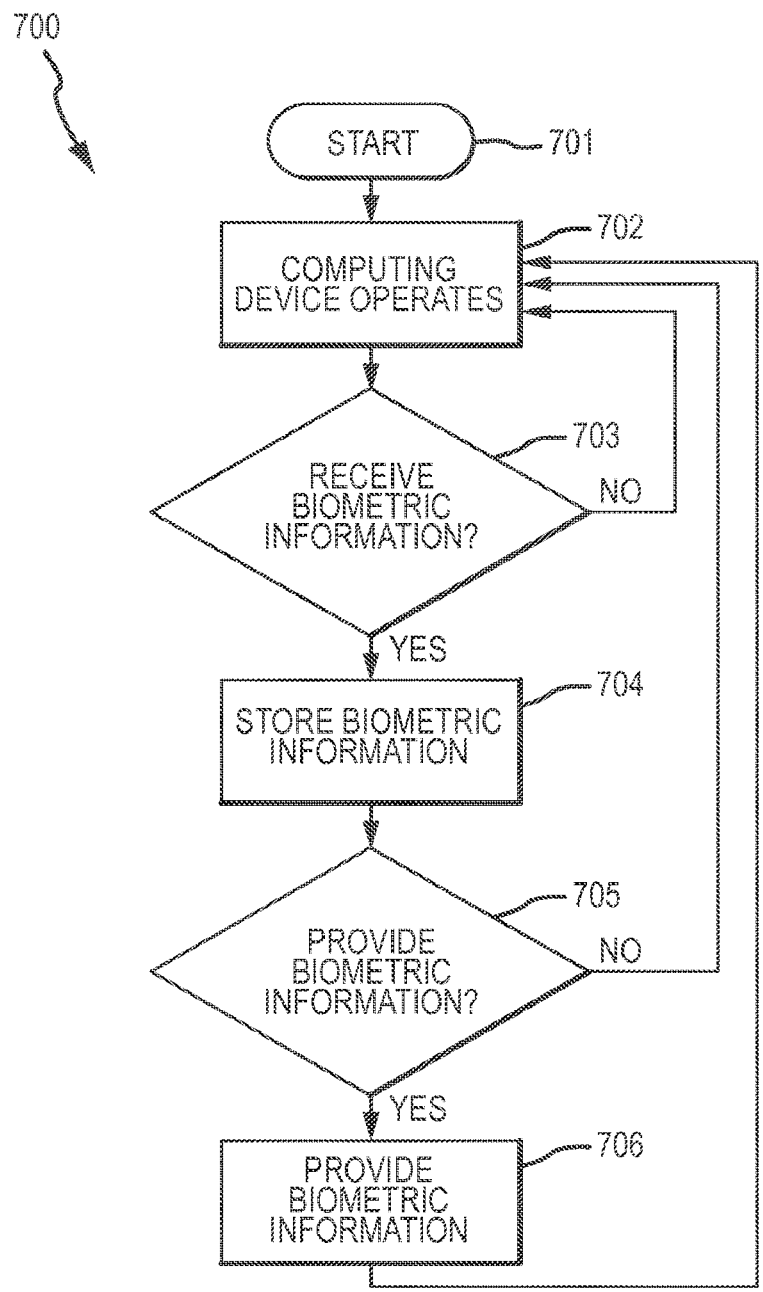
FIG. 7 is a flow chart illustrating a sixth example method for capturing biometric information for identifying unauthorized users. The method may be performed by the system of FIG. 1.

FIG. 7 illustrates a sixth example method 700 for capturing biometric information for identifying unauthorized users. The method 700 may be performed by the computing device 101 of FIG. 1. The flow begins at block 701 and proceeds to block 702 where the computing device operates. The flow then proceeds to block 703 where the computing device determines whether or not biometric information has been received (i.e., the trigger condition is operation of the computing device in this example). If so, the flow proceeds to block 704. Otherwise, the flow returns to block 702 and the flow continues to operate.

At block 704, after the computing device determines that biometric information has been received, the computing device stores the biometric information and the flow proceeds to block 705. At block 705, the computing device determines whether to provide the stored biometric information. If so, the flow proceeds to block 706 where the computing device provides the stored biometric information (such as to a request received directly by the computing device from an authorized user, a request received from the server computing device 102 and/or the client computing device 103, and so on) before the flow returns to block 702 and the computing device continues to operate. Otherwise, the flow returns directly to block 702 and the flow continues to operate.

Although the method 700 is illustrated and described above as including particular operations performed in a particular order, it is understood that this is for the purposes of example. Other arrangements that may include fewer and/or more operations are contemplated and possible without departing from the scope of the present disclosure. For example, the method 700 is illustrated and described above as determining whether or not to provide biometric information only after such information has been received and stored. However, in various implementations the computing device may provide any biometric information that has been captured and stored at any time a request is received during operation of the computing device.

Figure 8:
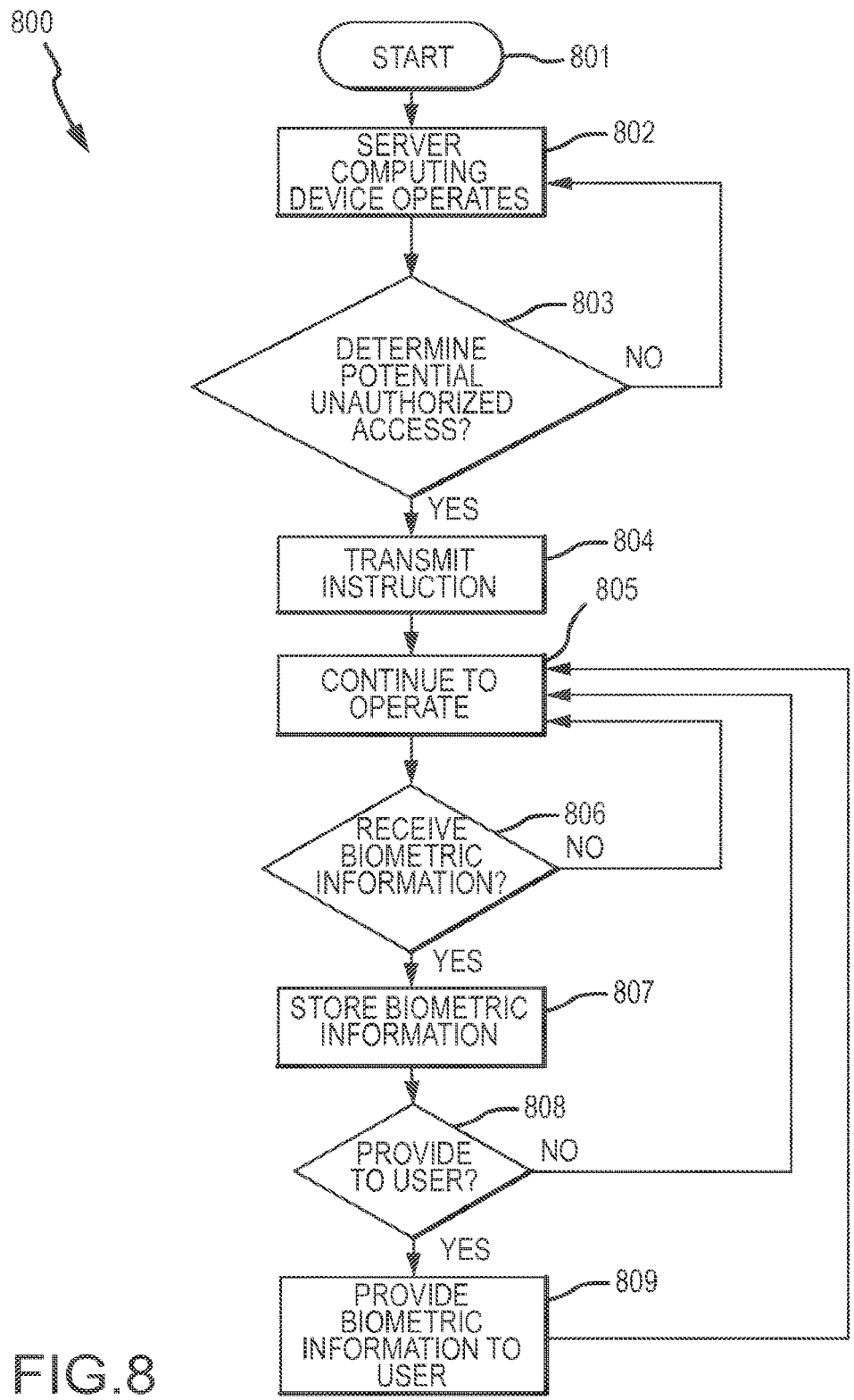
FIG. 8 is a flow chart illustrating a seventh example method for capturing biometric information for identifying unauthorized users. The method may be performed by the system of FIG. 1.

FIG. 8 illustrates a seventh example method 800 for capturing biometric information for identifying unauthorized users. The method 800 may be performed by the server computing device 102 of FIG. 1. The flow begins at block 801 and proceeds to block 802 where the server computing device operates. The flow then proceeds to block 803 where the server computing device determines whether or not potential unauthorized use of a computing device (such as the computing device 101) may be detected. Such potential unauthorized use may be determined by receiving data regarding attempted use of the computing device and determining whether or not such intended use deviates from normal usage patterns of the computing device. If so, the flow proceeds to block 804. Otherwise, the flow returned to block 802 and the server computing device continues to operate.

At block 804, the server computing device transmits an instruction to the appropriate computing device instructing the computing device to capture biometric information. The flow then proceeds to block 805 where the server computing device continues to operate before the flow proceeds to block 806.

At block 806, the server computing device determines whether or not captured biometric information is received from the instructed computing device. If so, the flow proceeds to block 807. Otherwise, the flow returns to block 305 where the computing device continues to operate.

At block 807, after the server computing device determines that captured biometric information is received from the instructed computing device, the server computing device stores the received biometric information. The flow then proceeds to block 808 where the server computing device determines whether or not to provide such stored biometric information to a user. Such a determination may be based on whether the user has requested stored biometric information, whether a threshold amount of biometric information has been stored (such as a complete fingerprint), and/or other such factors.

If the server computing device determines to provide such stored biometric information to the requesting user, the flow proceeds to block 809 where the server computing device provides the stored biometric information to the user (such as by transmitting the stored biometric information to the client computing device 103) before the flow returns to block 805 and the server computing device continues to operate. Otherwise, the flow returns directly to block 805.

Although the method 800 is illustrated and described above as including particular operations performed in a particular order, it is understood that this is for the purposes of example. Other arrangements that may include fewer and/or more operations are contemplated and possible without departing from the scope of the present disclosure. For example, the method 800 is illustrated and described above as just providing stored biometric information. However, in some cases the server computing device may also evaluate the biometric information (such as comparing a stored fingerprint to a database of user fingerprints to ascertain the identity of the user to whom the fingerprint belongs) and provide information regarding such analysis along with or instead of the stored biometric information.

Figure 9:
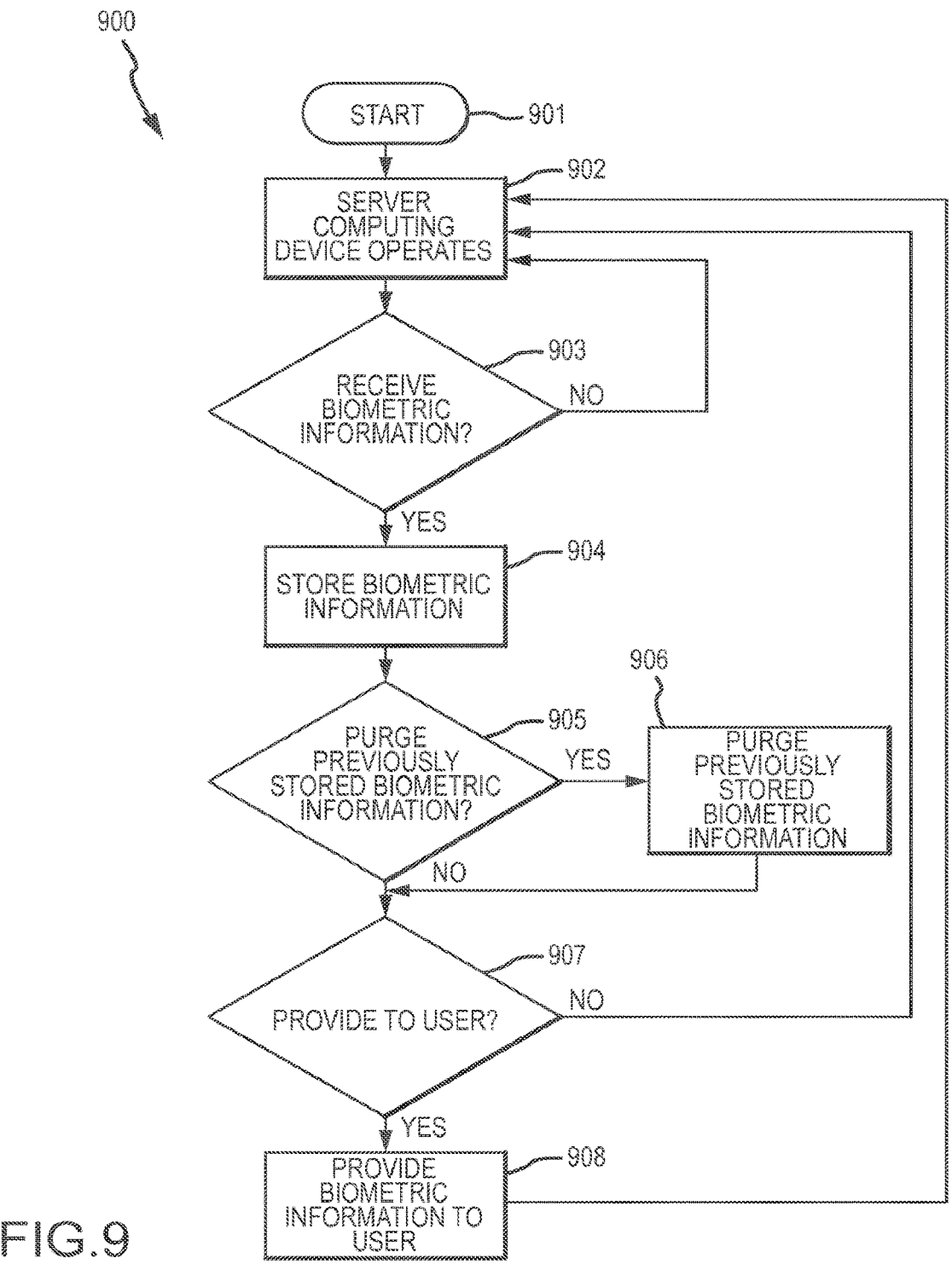
FIG. 9 is a flow chart illustrating a eighth example method for capturing biometric information for identifying unauthorized users. The method may be performed by the system of FIG. 1.

FIG. 9 illustrates an eighth example method 900 for capturing biometric information for identifying unauthorized users. The method 900 may be performed by the server computing device 102 of FIG. 1. The flow begins at block 901 and proceeds to block 902 where the server computing device operates. The flow then proceeds to block 903 where the server computing device determines whether or not captured biometric information is received from a computing device (such as the computing device 101, which may be configured such that the triggering condition for capture of biometric information is operation of the computing device). If so, the flow proceeds to block 904. Otherwise, the flow returns to block 902 where the computing device continues to operate.

At block 904, after the server computing device determines that captured biometric information is received from the computing device, the server computing device stores the received biometric information. The flow then proceeds to block 905 where the computing device determines whether or not to purge previously received biometric information. The server computing device may be configure to purge previously captured biometric information that was captured in association with a certain number of previous unauthorized access attempts (such as thirty), biometric information captured over a certain period of time previous (such as five days), biometric information associated with all previous unauthorized access attempts over a certain period of time (such as one month), and so on. If the server computing device determines to purge previously stored biometric information, the flow proceeds to block 906 where the server computing device purges such previously stored biometric information before the flow proceeds to block 907. Otherwise, the flow proceeds directly to block 907.

At block 907, the server computing device determines whether or not to provide such stored biometric information to a user. Such a determination may be based on whether the user has requested stored biometric information, whether a threshold amount of biometric information has been stored (such as a complete fingerprint), and/or other such factors.

If the server computing device determines to provide such stored biometric information to the requesting user, the flow proceeds to block 908 where the server computing device provides the stored biometric information to the user (such as by transmitting the stored biometric information to the client computing device 103) before the flow returns to block 805 and the server computing device continues to operate. Otherwise, the flow returns directly to block 805.

Although the method 900 is illustrated and described above as including particular operations performed in a particular order, it is understood that this is for the purposes of example. Other arrangements that may include fewer and/or more operations are contemplated and possible without departing from the scope of the present disclosure. For example, the method 900 is illustrated and described above as determining whether or not to purge previously stored biometric information after receipt of captured biometric information. However, in some cases the server computing device may determine whether or not to purge previously stored biometric information at any time during operation.

Figure 10:
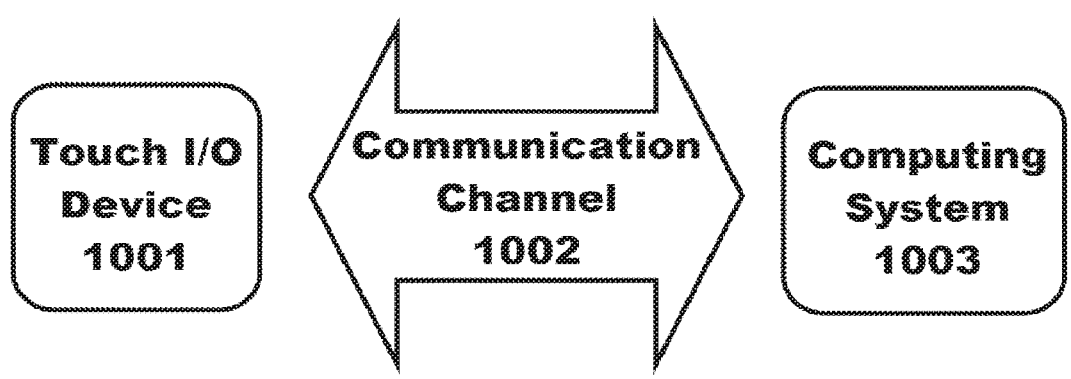
FIG. 10 is a block diagram illustrating a touch I/O device that can receive touch input for interacting with a computer system. The computer system may perform the method of FIGS. 2-9.

Described embodiments may include touch I/O device 1001 that can receive touch input for interacting with computing system 1003 (FIG. 10) via wired or wireless communication channel 1002. The computing system 1003 may be configured to perform one or more of the methods 200-900 of FIGS. 2-9. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

In various implementations, one or more fingerprint sensors may be incorporated into the touch I/O device 1001, located underneath the touch I/O device 1001, incorporated into one or more other touch I/O devices (which may be different types of touch I/O device than the touch I/O device 1001), and so on.

Figure 11:
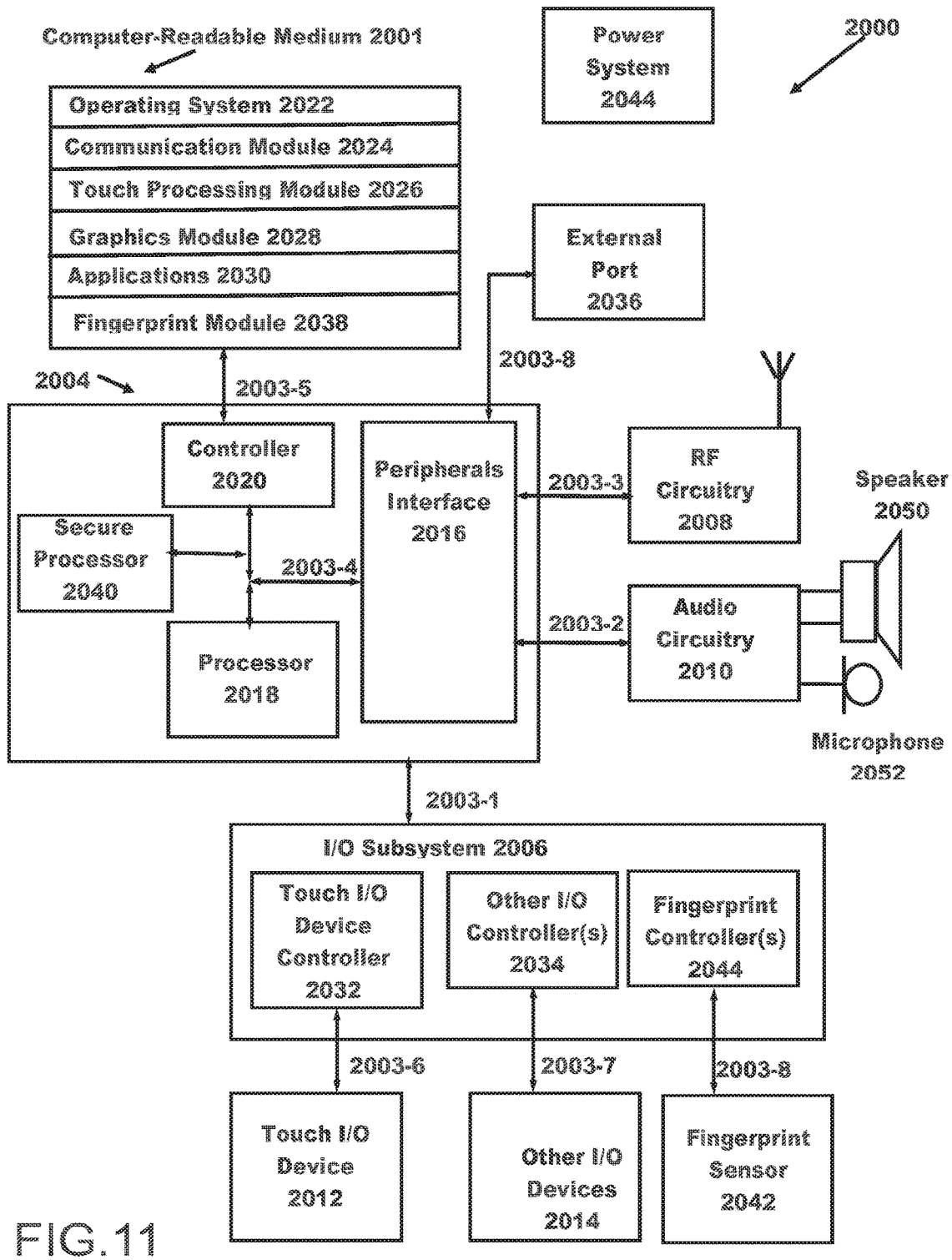
FIG. 11 is a block diagram illustrating computer system that includes a touch I/O device that can receive touch input for interacting with the computer system. The computer system may perform the methods of FIGS. 2-9.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 11 is a block diagram of one embodiment of system 2000 that generally includes one or more computer-readable media 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations. The system may be configured to perform one or more of the methods 200-900 of FIGS. 2-9.

It should be apparent that the architecture shown in FIG. 11 is only one example architecture of system 2000, and that system 2000 could have more or fewer components than shown, or a different configuration of components. The various components shown in FIG. 11 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with FIGS. 2-9. Fingerprint sensing module 2038 may at least be executed to, or otherwise function to, perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. Secure processor 2040 may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh."

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for capturing biometric information for identifying unauthorized users, comprising:
at least one computing device, comprising:
at least one biometric sensor;
at least one processing unit, communicably coupled to the at least one biometric sensor; and
at least one non-transitory storage medium storing instructions executable by the at least one processing unit to:
receive at least one instruction from at least one additional computing device to capture biometric information, wherein the at least one instruction is received based on an unauthorized use of the at least one computing device;
capture said biometric information without making said unauthorized user aware of said capture;
receive the biometric information from the at least one biometric sensor;
store the biometric information; and
purge at select times at least a portion of the stored biometric information according to a purging rule, wherein the purging rule is based on at least one of:
a given number of unauthorized access attempts;
a given period of time;
a type of biometric information;
a determination whether the biometric information comprises a complete set of biometric information; or
an amount of biometric information associated with a type of biometric information.

2. The system of claim 1, wherein the biometric information comprises at least one of at least one fingerprint of a current user, at least one image of the current user, video of the current user, audio of an environment of the computing device, or forensic user interface information.

3. The system of claim 1, wherein the at least one processing unit executes instructions stored in the at least one non-transitory storage medium to provide the stored biometric information.

4. The system of claim 3, wherein the at least one processing unit provides the biometric information by transmitting the biometric information to at least one additional computing device.

5. The system of claim 4, wherein the at least one processing unit transmits the biometric information to the at least one additional computing device in response to at least one request for the biometric information received from the at least one additional computing device.

6. The system of claim 1, wherein the at least one processing unit executes instructions stored in the at least one non-transitory storage medium to evaluate the biometric information to determine an identity of said unauthorized user associated with the biometric information.

7. The system of claim 1, wherein the at least one processing unit time stamps the biometric information.

8. The system of claim 1 wherein the at least one non-transitory storage medium storing instructions executable by the at least one processing unit to store the biometric information includes storing the biometric information in an encrypted and/or otherwise hidden form.

9. A method for capturing biometric information for identifying unauthorized users, the method comprising:
determining, by a first computing device, to capture biometric information based on receipt of at least one instruction from a second computing device to capture biometric information, wherein the at least one instruction is received based on:
one or more failed authentication attempts on the first computing device;
an unauthorized use of the first computing device; or
a use or an attempted use of the first computing device that deviates from past usage patterns;
capturing, by the first computing device, said biometric information without making said unauthorized user aware of said capture utilizing at least one biometric sensor;
receiving, by the first computing device, the biometric information, utilizing the at least one processing unit, from the at least one biometric sensor;
storing, by the first computing device, the biometric information utilizing the at least one processing unit; and
purging at select times at least a portion of the stored biometric information according to a purging rule, wherein the purging rule is based on at least one of:
a given number of unauthorized access attempts;
a given period of time;
a type of biometric information;
a determination whether the biometric information comprises a complete set of biometric information; or
an amount of biometric information associated with a type of biometric information.

10. The method of claim 9, wherein the biometric information comprises at least one of at least one fingerprint of a current user, at least one image of the current user, video of the current user, audio of an environment of the computing device, or forensic user interface information.

11. The method of claim 9 further comprising transmitting, by the first computing device, the biometric information to at least one additional computing device.

12. The method of claim 11, wherein said operation of transmitting the biometric information to at least one additional computing device is performed in response to at least one request for the biometric information received from the at least one additional computing device.

13. The method of claim 9, further comprising evaluating, by the first computing device, the biometric information to determine an identity of said unauthorized user associated with the biometric information.

14. The method of claim 9, further comprising time stamping the biometric information.

15. The method of claim 9 wherein the step of storing the biometric information includes storing the biometric information in an encrypted and/or otherwise hidden form.

16. The method of claim 9, further comprising capturing audio of an environment of the first computing device.

17. The method of claim 9, wherein the biometric information comprises a video of a current user.

18. A method for capturing biometric information for identifying unauthorized users, the method comprising:
transmitting at least one instruction to capture biometric information to a first computing device utilizing at least one second computing device, wherein the transmission of the at least one instruction is based on a request from an owner of the first computing device to capture the biometric information;
capturing said biometric information without making said unauthorized user aware of said capture;
receiving the biometric information at the at least one second computing device from the first computing device;
storing the received biometric information utilizing the at least one second computing device; and
purging at select times at least a portion of the stored biometric information according to a purging rule, wherein the purging rule is based on at least one of:
a given number of unauthorized access attempts;
a given period of time;
an identified type of biometric information;
a determination whether the biometric information comprises a complete set of biometric information; or
an amount of biometric information associated with a type of biometric information.

19. The method of claim 18 wherein the step of storing the received biometric information includes storing the biometric information in an encrypted and/or otherwise hidden form.

20. The method of claim 18, wherein the request is received from an application accessed on the at least one second computing device.

21. The method of claim 18, wherein the request comprises a user request received by the at least one second computing device.

22. The method of claim 18, further comprising evaluating, by the second computing device, the biometric information to determine an identity of said unauthorized user associated with the biometric information.

* * * * *